United States Patent [19]

Ashley

[11] Patent Number: 4,779,469
[45] Date of Patent: Oct. 25, 1988

[54] POWER AND SIGNAL TRANSFER UNIT

[75] Inventor: Paul E. Ashley, Phoenix, Ariz.

[73] Assignee: Honeywell, Inc., Minneapolis, Minn.

[21] Appl. No.: 48,431

[22] Filed: May 11, 1987

[51] Int. Cl.$^4$ .................. G01C 19/28; H01R 39/00
[52] U.S. Cl. .................................. 74/5.6 D; 439/13
[58] Field of Search ................. 74/5.6 D; 439/11, 13

[56] References Cited

U.S. PATENT DOCUMENTS

| | | | |
|---|---|---|---|
| 2,550,149 | 4/1951 | Hart | 439/11 X |
| 2,595,951 | 5/1952 | Konet et al. | 74/5.6 D X |
| 3,526,145 | 9/1970 | Boerner et al. | 74/5.6 D X |
| 4,098,546 | 7/1978 | Swartz et al. | 74/5.6 D X |
| 4,335,927 | 6/1982 | Allen et al. | 74/5.6 D X |
| 4,533,796 | 8/1985 | Engelmore | 439/13 X |
| 4,696,523 | 9/1987 | Schauer et al. | 439/11 |

Primary Examiner—Rodney H. Bonck
Attorney, Agent, or Firm—Howard Paul Terry

[57] ABSTRACT

A power and signal transfer unit has a stator assembly and a rotor assembly for a control moment gyroscope and for overcoming the problem of electrical noise in a slip ring by using a slip ring having a flexible cable. A stator assembly has a frame member and having a plurality of brushes. A rotor assembly includes a rotor member, and includes a flexible cable having a plurality of conductors, each conductor being connected at an inner terminal to the rotor member and being connected at an outer terminal, and includes a slip ring member rotatably supported by the frame member for rotation relative to the frame member and having a plurality of conductive portions, each conductive portion being respectively connected to an outer terminal and being in contact with on of the brushes.

8 Claims, 2 Drawing Sheets

POWER AND SIGNAL TRANSFER UNIT

This invention was made with United States Government support and the United States Government has certain rights therein.

BACKGROUND OF THE INVENTION

The present invention relates to a power and signal transfer unit and particularly a gyroscope power and signal transfer unit having a brush block portion for large angle displacement and having a flexible cable for small angle displacement.

The prior art gyroscope power and signal transfer unit includes an outer gimbal having a brush block and an inner gimbal having a slip ring. In certain types of gyroscopes, such as control moment gyroscopes, there is a relatively large angle of angular displacement of the inner gimbal relative to the outer gimbal. With a control moment gyroscope transfer unit, there is continuous wear of the brushes and slip ring bearing surface in contact with the brushes.

One problem with the prior art transfer unit is the electrical noise during angular displacement which results after mechanical wear of the brushes and slip ring bearing surfaces. Such wear becomes more rapid, as there is a continuous dither motion of the inner gimbal relative to the outer gimbal. After such wear due to the dither motion, there is more severe electrical noise. This problem exists with a closed loop, control moment gyroscope, transfer unit, in particular.

SUMMARY OF THE INVENTION

According to the present invention, a power and signal transfer unit is provided. The unit comprises a stator assembly having a frame member connected to the outer gyroscope gimbal and having a plurality of brushes mounted on the frame member; and comprises a rotor assembly having a rotor member connected to the inner gimbal, a flexible cable connected to the rotor member at one end of the flexible cable, a slip ring member rotatably supported by the frame member and connected to the other end of the flexible cable, said cable having an inner terminal at its connection to the rotor member and having an outer terminal at its connection to the slip ring member, for conducting power and signals from the interior of the inner gimbal to the exterior of the brushes at the exterior of the transfer unit.

By using the structure of the stator assembly according to the present invention, wear due to repetitive small angle displacement or dither motion is entirely eliminated. That is, the mechanical wear of the brushes and slip ring bearing surfaces due to dither motion is eliminated. The problem of electrical noise during largeangle displacement is also substantially minimized. By using such stator assembly, the flexible cable spares the slip ring member from the effect of small angle, back and forth, dither motion. When the cable reaches the end of its travel, the flexible cable engages the slip ring member so that the upper range of angular displacement is not limited. The stator assembly operates under continuous dither motion without mechanical wear, and operates over large angular displacements or excursions, as required by the gyroscope design and application, with substantially less wear than the prior art transfer unit.

The above advantages and the subsequent description will be more readily understood by reference to the following drawings.

DESCRIPTION OF THE PREFERRED EMBODIMENT

Figure 1:
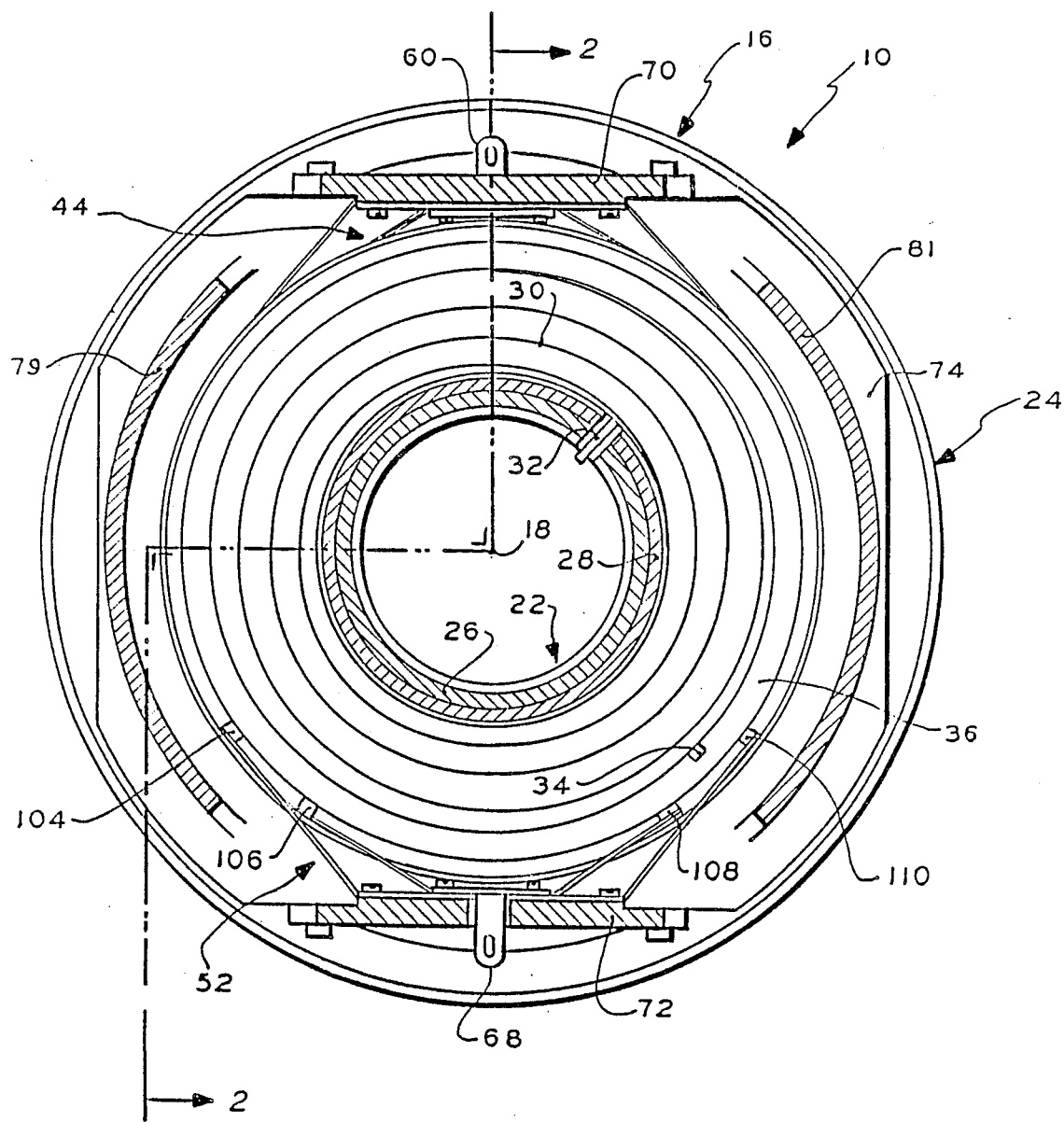
FIG. 1 is a sectional view of an embodiment of the present invention taken along lines 1—1 of FIG. 2.

In FIG. 1, a gyroscope 10 is shown. Gyroscope 10 includes an outer gimbal 12, an inner gimbal 14, and a power and signal transfer unit 16. Gyroscope 10 has a gimbal pivot axis 18. Gimbals 12 and 14 have a conventional bearing unit 20.

Transfer unit 16 includes a rotor assembly 22 and a stator assembly 24.

Rotor assembly 22 includes a trunnion 26, which is joined to inner gimbal 14, a cable rotor 28, connected to gimbal 14, a cable 30 having inner terminals 32 and outer terminals 34, and a slip ring 36. Rotor 28 has a cylindrical shape. Cable 30, which is a flexible cable, has a roll shape. Slip ring 36 has a cylindrical shape.

Cable or flexible tape 30 is a flexible composite sheet, which has a flexible base sheet, with a plurality of flexible metal conductors bonded to the base sheet. A single inner terminal 32 is connected to an inner end of each conductor. A single outer terminal 34 is connected to an outer end of each conductor.

Stator assembly 24 includes a plurality of top brushes 38, 40, 42, 44 and a plurality of bottom brushes 46, 48, 50, 52. Top brushes 38, 40, 42, 44 have respective top terminals 54, 56, 58, 60. Bottom brushes 46, 48, 50, 52 have respective bottom terminals 62, 64, 66, 68.

Stator assembly 24 also includes a top brush block 70, which supports top brushes 38, 40, 42, 44. Stator assembly 24 also includes a bottom brush block 72, which supports bottom brushes 46, 48, 50, 52. Stator assembly 24 has a frame 74, which has a ring shape, and which supports top and bottom brush blocks 70, 72.

Frame 74 has a first bearing unit 76, which supports slip ring 36 at one end thereof. Frame 74 also has a second bearing unit 78, which supports slip ring 36 at the other end thereof. Bearings 76, 78 support slip ring 36, while allowing angular displacement of slip ring 36 about axis 18 relative to stator assembly 24, and independently also relative to trunnion 26 and cable rotor 28.

Figure 2:
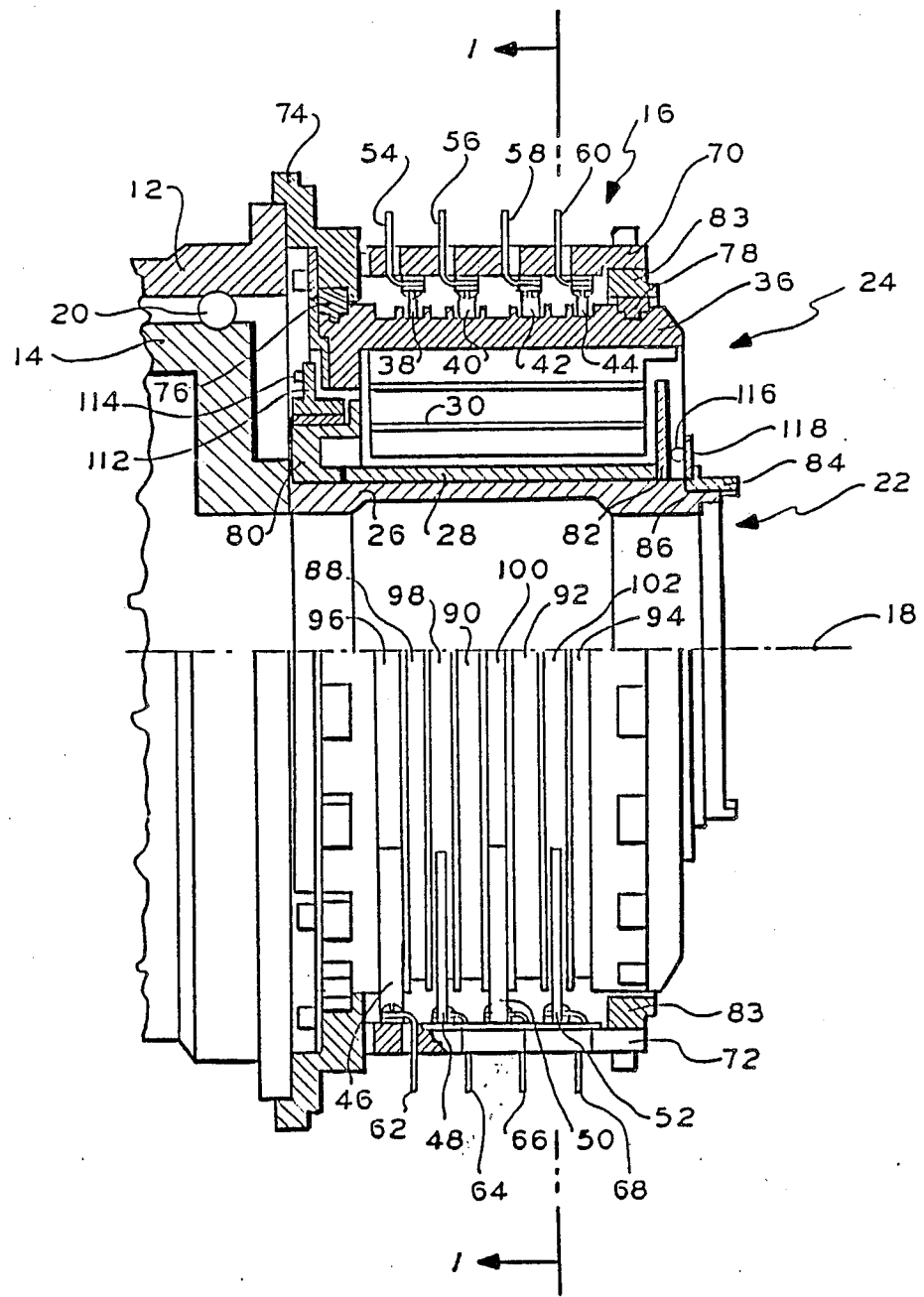
FIG. 2 is a sectional view taken along lines 2—2 of FIG. 1.

Frame 74 has two cantilevered wall portions 79, 81 (FIG. 1), which support an outer ring portion 83 (FIG. 2). Ring portion 83 supports second bearing unit 78.

Trunnion 26 has a first retainer 80, which bears against gimbal 14, a second retainer 82, which bears against cable rotor 28, and a threaded ring 84, which bears against second retainer 82. In this way, cable rotor 28 is fixedly connected to trunnion 26. Trunnion 26 has a threaded portion 86, which receives threaded ring 84.

With this construction, trunnion 26 and cable rotor 28 which are fixedly connected, can dither back and forth over a small angle, relative to slip ring 36, without causing angular movement of slip ring 36. Such dither motion of trunnion 26 and inner gimbal 14, which are fixedly connected, is the usual motion of inner gimbal 14 in a closed loop, control moment type of gyroscope 10. During such dither motion, there is no movement of slip ring 36, and no frictional wear of its bearing surfaces as described hereafter, and of the respective brushes 38, 40, 42, 44, 46, 48, 50, 52.

Slip ring 36 has a plurality of bearing surfaces 88, 90, 92, 94, which respectively engage brushes 38, 40, 42, 44. Slip ring 36 also has a plurality of bearing surfaces 96, 98, 100, 102, which respectively engage brushes 46, 48, 50, 52.

Brush 52, which is a typical brush, has brush tips 104, 106, 108, 110 (FIG. 1), which engage the bearing surface 102.

The top terminals 54, 56, 58, 60 and bottom terminals 62, 64, 66, 68 are connected to respective leads (not shown).

First retainer 80, which is fixedly connected to trunnion 26 and to cable rotor 28 has a radially projecting, actuator tab 112, which engages one of two axially projecting, actuator pins 114 on slip ring 36, after cable rotor 28 passes through a maximum angular displacement in either direction. In this way, slip ring 36 is actuated at the maximum displacement of cable rotor 28.

Second retainer 82 has an 0-ring 116, and has a spacer 118, which bears against 0-ring 116 and which engages threaded ring 84.

Actuator tabs 112 and respective actuator pins 114 are disposed in an angular spacing, so that cable rotor 28 can move through some angle, less than a one-half revolution, in each direction before engagement of the tabs 112 with the pins 114.

Transfer unit 16 uses slip ring 36 and cable 30 so that the advantages of each are used, but the disadvantage of each are eliminated. The angular range of cable 30 is less than about one-half revolution in each direction, and its electrical noise is nonexistent. The angular range of slip ring 36 is unlimited and the mechanical wear of its bearing surfaces 88, 90, 92, 94, 96, 98, 100, 102 is greatly minimized. Cable 30 handles the dither motion and small angular movements, and slip ring 36 handles the large angular movements. During dither motion of cable 30 there is substantially no electrical noise. During large angular movement of slip ring 36 electrical noise is minimized due to the longer wearing life of bearing surfaces 88, 90, 92, 94, 96, 98, 100, 102 and brushes 38, 40, 42, 44, 46, 48, 50, 52. Also, the bearing pressure of each such brush can be increased relative to the bearing pressure of the brush of the prior art transfer unit. Thus, electrical noise, which is generated by the angular movement of slip ring 26 is minimized.

Cable 30 is about four feet in length in the preferred embodiment, as shown in FIG. 1. Cable 30 is coiled in the fashion of a clock spring. In this embodiment, as shown in FIG. 2, there are only eight brushes 38, 40, 42, 44, 46, 48, 50, 52; and there are eight outer terminals 34 and there are eight inner terminals 32. A lead (not shown) connects to each inner terminal 32 and extends inside inner gimbal 14. Frame 74 is composed of a metal material, such as aluminum. Slip ring 36 and brush blocks 70, 72 are composed of molded, plastic material. The bearing surfaces of slip ring 36 use an electrically conductive plating material and are electrically insulated by slip ring 36.

The first bearing unit 76 is fixedly positioned in an axial direction relative to frame 74 and slip ring 36. The second bearing unit 78 is slightly movable relative to frame 74 in an axial direction parallel to axis 18. The axial freedom of bearing unit 78 allows for a differential thermal expansion of slip ring 36 and brush blocks 70, 72 relative to frame 74. Brush blocks 70, 72 have a thermal expansion approximately the same as that of slip ring 36 in an axial direction, as they are composed of similar material.

The advantages of transfer unit 16 are described hereafter.

Transfer unit 16 uses a flexible cable 30, which has a long life in continuous operation.

The flexible cable 30 accommodates dither motion and small angle displacements within a normal design range.

Slip ring 36 is activated only when the angular displacement of inner gimbal exceeds the normal range, which is an optional range to suit the gyro 10.

Brushes 38, 40, 42, 44, 46, 48, 50, 52 and their respective bearing surfaces 88, 90, 92, 94, 96, 98, 100, 102 are inactive in the normal displacement range of gyro 10.

Very little slip ring travel is expected, so that a relatively high bearing pressure, between the brushes and their respective bearing surfaces, can be used. In this way, relatively good slip ring contact is obtained without an expectation of excessive wear of the brushes and the slip ring bearing surfaces.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A gyroscope power and signal transfer unit, comprising:
   a first gimbal with a stator assembly having a frame member and having a plurality of brushes mounted on the frame member and having an axis; and
   a second gimbal with a rotor assembly rotable about the axis in angular displacements away from a null position relative to the stator assembly;
   said rotor assembly including:
   a rotor member;
   a flexible cable having a plurality of conductors, each conductor being connected to the rotor member at one end of the conductor; and
   a slip ring member rotatably supported by the frame member and connected to the other end of each conductor,
   whereby said rotor member can rotate in either direction away from the null position relative to the stator assembly, said flexible cable can rotate in either direction together with the rotor member relative to the slip ring member up to a maximum displacement angle, said slip ring member can rotate in either direction together with the rotor member beyond the maximum displacement angle of the flexible cable.

2. A power and signal transfer unit comprising:
   a stator assembly having a frame member and having a plurality of brushes mounted on the frame and having an axis; and
   a rotor assembly rotatable about the axis in angular displacemnts away from a null position relative to the stator assembly;
   said rotor assembly including:
   a rotor member;
   a flexible cable having a plurality of conductors, each conductor being connected to the rotor member at one end of the conductor; and a slip ring member rotatably supported by the frame member and connected to the other end of each conductor wherein said power and signal transfer unit also comprises:

a gyroscope outer gimbal fixedly connected to said stator assembly coaxially therewith;

a gyroscope inner gimbal fixedly connected to said rotor assembly coaxially therewith; and a bearing unit disposed between said outer gimbal and said inner gimbal;

whereby said rotor member can rotate in either direction away from the null position relative to the stator assembly, said flexible cable can rotate in either direction together with the rotor member relative to the slip ring member up to a maximum displacement angle, said slip ring member can rotate in either direction together with the rotor member beyond the maximum displacement angle of the flexible cable.

3. The transfer unit of claim 2, including:

a trunnion member fixedly connected to said inner gimbal coaxially therewith, said trunnion member having a cylindrical shape;

said rotor member having a cylindrical shape and being disposed radially outwardly of said trunnion member coaxially therewith;

said flexible cable having a roll shape and being disposed radially outwardly of said rotor member coaxially therewith;

said slip ring member having a cylindrical shape and being disposed radially outwardly of said flexible cable coaxially therewith; and each conductor of said flexible cable having an inner terminal projecting inside said trunnion member and having an outer terminal projecting through the slip ring.

4. The transfer unit of claim 3, wherein said stator assembly includes:

a plurality of top brushes having respective top terminals;

a plurality of bottom brushes having respective bottom terminals;

said top brushes and bottom brushes being arranged in alternate axial spacing;

each said brush having a brush tip; and wherein said slip ring member has a plurality of axially spaced conductive portions having bearing surfaces, each bearing surface being connected to said outer terminal of one of the conductors at the outer end of the conductor; and each said brush tip being in electrical contact with a respective slip ring bearing surface, for conduction from the inner terminal of each conductor through the conductor and outer terminal and bearing surface and brush to the brush terminal.

5. The transfer unit of claim 4, wherein said frame member is supported by the gyroscope outer gimbal;

a top brush block supported by the frame member and supporting the top brushes;

a bottom brush block supported by the frame member and supporting the bottom brushes;

said frame member having two cantilevered wall portions;

said frame member having a first bearing unit supporting the slip ring member at the axially inner end thereof;

said frame member having a second bearing unit supported by said two cantilevered wall portions and supporting the slip ring at the axially outer end thereof.

6. The transfer unit of claim 5, wherein said trunnion member has a first retainer unit bearing against the gyroscope inner gimbal; and a second retainer unit bearing against the rotor member; and a threaded ring member bearing against the second retainer unit.

7. The transfer unit of claim 6, wherein said first retainer unit has an actuator tab, and said slip ring member has two angularly spaced pins disposed on opposite sides of the tab in a circumferential direction, whereby the rotor member can rotate relative to the stator assembly and slip ring member up to a maximum displacement angle in either direction from the null position and whereby the slip ring member is actuated to rotate relative to the stator assembly beyond the maximum displacement angle in either direction from the null position.

8. A gyroscope power and signal transfer unit comprising:

a gyroscope outer gimbal;

a gyroscope inner gimbal displaceable through an angle about a gimbal axis relative to the outer gimbal;

a stator assembly connected to the outer gimbal;

a rotor assembly connected to the inner gimbal; and said stator assembly including:

a frame member having a top brush block and a bottom brush block and having two cantilevered wall portions and having a first bearing unit and a second bearing unit;

a plurality of top brushes with brush tips;

a plurality of bottom brushes with brush tips; and said rotor assembly including:

a cylindrical trunnion member fixedly connected to the inner gimbal;

a cylindrical rotor member;

a flexible cable of a roll shape having a flexible base member and a plurality of flexible conductors, each conductor having an inner terminal extending inside the inner gimbal and having an outer terminal;

a cylindrical slip ring member rotatably supported by the first and second bearing units and having a plurality of conductive portions with bearing surfaces, each conductive portion being fixedly connected to a respective outer terminal of the flexible cable, each bearing surface being in contact with a single brush tip;

said trunnion member having a first retainer unit bearing against the inner gimbal and having a second retainer unit bearing against the rotor member and having a threaded ring member bearing against the second retainer unit;

said first retainer unit having an actuator tab and said slip ring member having two peripherally spaced pins;

whereby the rotor member can rotate in either direction away from the null position relative to the brush blocks, and the flexible cable can rotate in either direction or dither together with the rotor member relative to the slip ring member and the brushes up to a maximum displacement angle, and the slip ring member can be actuated to rotate in either direction together with the rotor member beyond the maximum displacement angle of the flexible cable up to an unlimited specified angle.

* * * * *